Patented Apr. 10, 1934

1,954,400

UNITED STATES PATENT OFFICE 1,954,400

PROCESS OF MAKING RUSTLESS IRON

William B. Arness, Towson, Md., assignor to Alloy Research Corporation, Baltimore, Md., a corporation of Delaware No Drawing. Application August 24, 1932, Serial No. 630,241

13 Claims. (Cl. 75—22.5)

The present invention relates to the manufacture of low-carbon high-chromium steels of the type generally known as rustless or stainless irons, and more especially to a process for remelting or reclaiming rustless iron scrap. While the chemical composition of low-carbon chromium alloy steels, herein designated as rustless irons, may vary considerably, it is common practice at the present time for such steels to contain in the neighborhood of .05 to .15% carbon and from 12 to 20% or more chromium. Other additional alloying elements may be present, such as copper, nickel, tungsten, molybdenum, vanadium, etc., but in every case the corrosion resistant property of the steel is primarily dependent on its chromium content.

The present invention has particularly to do with the remelting or reclaiming of rustless iron scrap in the manufacture of rustless iron. In accordance with my process, as briefly outlined, an electric furnace, such as the usual carbon electrode Heroult steel-making furnace, is charged with rustless iron scrap, a material high in iron oxide such as roll scale, and chrome ore. Any convenient quantity of the rustless iron scrap may be used, preferably ranging from approximately 40 to 85% of the tapping weight of the metal. Some plain carbon scrap may also be used in the meltdown charge.

The charge is melted and the bath brought to a relatively high temperature, higher than that usually employed in steel melting down operations. The roll scale and chrome ore form a supernatant slag on the molten iron. The iron oxide in the roll scale behaves as an energetic oxidizing agent, and the iron oxide contained in the chrome ore also possesses the same characteristic. Its presence in the slag on the molten metal serves as a carbon oxidizing barrier to prevent the carbon from the electrodes from getting into the metal. The iron oxide in the charge also tends to oxidize any carbon which may get to the charge from the electrodes in the initial stages of the meltdown before the formation of the iron oxide-containing meltdown slag. The iron oxide also tends to oxidize any carbon which may be present in the scrap charge.

In the second stage of the operation, a mixture of burnt lime, preferably preheated to eliminate moisture, and a silicon reducing agent, preferably 75% ferrosilicon, is charged onto the slag, whereupon the iron and chromium oxides in the slag are reduced to metallic iron and chromium and enter the metal layer. If desired, some chrome ore may be charged with the lime and silicon reducing agent, particularly when a ferrosilicon having a high percentage of silicon is employed. After complete (90% or better) reduction of chromium accompanied by substantially complete reduction of iron oxide out of the slag into the metal bath has been accomplished, the slag is preferably drawn off, and a conventional finishing slag of lime, pulverized ferrosilicon and fluorspar is formed on the bath. Final additions to bring the metal to the proper specifications, such as the additions of lump ferrosilicon, or low-carbon ferromanganese, or other alloying additions, are then made and the heat is tapped. In the melting of low-carbon high-chromium scrap iron and steel the difficulties of maintaining a low-carbon bath of metal become almost insurmountable. The tendency toward carbon pick-up by the bath becomes increasingly great as the desired carbon content decreases. This tendency becomes great indeed, where as here the amount of chromium present (having a strong affinity for carbon) is considerable.

It is apparently necessary to employ an energetic oxidizing agent, such as a material high in iron oxide, to maintain a low carbon content in the metal. The iron reduced from the iron oxide and the iron from the ferrosilicon dilutes the rustless iron scrap, and hence it is necessary to enrich the bath with chromium to secure the requisite percentage of chromium in the final product. I secure the greater part, if not all, of the additional chromium for such enrichment from chrome ore, which is a cheap source of chromium. The chrome ore added with the meltdown charge becomes thoroughly heated and incorporated into the supernatant slag, so that a vigorous reaction takes place when the ferrosilicon and lime are added to the slag and the reducing stage of the operation is shorted, thereby minimizing any chance of carbon absorption from the electrodes during the reducing operation. The lime combines with the silica produced by the oxidation of the silicon, forming calcium silicate, thus removing the silica and tending to haste the reducing operation.

It is a well-known fact that chrome ore is a refractory and difficultly fusible material containing, as it invariably does, a relatively important percentage of alumina and magnesia. By incorporating the chrome ore with the original charge, a sufficiently long time is afforded for the heating of the chrome ore and for its thorough diffusion in the slag formed by the roll scale. I have found that in order to keep the carbon at the desired minimum, a large excess of iron oxide should be employed. This large excess of iron oxide provides an agent for oxidizing chromium from the molten rustless iron as well as the carbon present in the metal and that coming from the furnace electrodes. The initial presence of the relatively large quantity of chromium oxide inhibits the oxidation of chromium from the melting or molten metal since the vigor of this oxidizing action is inversely proportional to the amount of chromium oxide already contained in the slag. The amount of iron oxide is determined primarily by the amount of carbon to be reduced and also by the amount of chromium in the charge. The greater the chromium in the charge and the greater the amount of carbon to be reduced, the greater must be the excess of iron oxide. The amount of iron oxide is always in excess of that theoretically required to combine with the carbon in the charge plus the probable carbon pickup during melting. The amount of iron oxide may be as much as 5 to 50 times that theoretically required to combine with such carbon.

From the metallurgical standpoint it would appear that the process of carbon oxidation during the first or oxidizing step is based on the principle that in order to obtain any given minimum carbon content say .10% or less during the oxidizing step it is necessary to maintain the slag at or above a certain definite minimum percentage of iron oxide. As the desired minimum carbon content is lowered the required minimum percentage of iron oxide in the slag is increased in even greater proportions. The amount of oxidizing agent required to obtain a desired low percentage of carbon, however, decreases as the furnace operating temperatures are increased.

The following illustrative heat shows approximately the preferred way of operating my process in a standard 6-ton Heroult electric arc furnace. The furnace is provided with the usual carbon electrodes, and by the term "carbon electrodes" I intend to include the usual electrodes which may be made of different varieties of carbon, such as amorphous carbon, graphite, etc. The furnace is preferably provided with a chromite brick bottom lining. A lining of chromite brick is carried somewhat above the slag line, and a lining containing chrome ore is preferably rammed in over the chromite brick hearth lining. This lining may consist entirely of chrome ore, although I may use a lining of about one-half chrome ore and about one-half "Magdolite". Magdolite is a commercial blend of magnesia and lime with sufficient iron oxide and other impurities to act as a bond or sintering agent. Any suitable binder, such as sodium silicate, may be used. The hearth lining is inevitably eroded by the slag and the metal bath, but the cost of refractories is minimized by the recovery of chromium from the chromium oxide content of the eroded portion. The side walls and roof of the furnace may be of silica brick, in accordance with ordinary practice.

The following is a typical heat made in accordance with my process. The furnace is given an initial charge consisting of 12,600 pounds of rustless iron scrap analyzing about 17% chromium and about .10% carbon; 3250 pounds of plain low carbon steel scrap; 2850 pounds of chromite ore containing about 48% chromium oxide ($Cr_2O_3$); and 1000 pounds of roll scale which is substantially 100% magnetic iron oxide, and from which about 70% metallic iron is recovered. The power is applied and the charge is rapidly melted and brought to a relatively high temperature, preferably considerably above the temperature ordinarily employed for the usual steel melting down operation in an electric furnace. This higher temperature I designate as "superheat". No reliable method is known to me for acurately determining the temperature of the metal bath under the slag blanket, but it is estimated that this temperature should be approximately 3050 to 3200° F., which is some 100 to 250° F. higher than is usually employed in ordinary electric steel melting practice. This superheat renders the iron oxide more active in combining with carbon, and thus excluding and removing carbon from the metal. After melting down, additional mill scale may be added to the slag, if required.

After determining by analysis of metal samples taken from the bath that the carbon content of the bath is at or below the desired maximum percentage, usually .10%, the second or reducing step is carried out by adding to the bath about 4,500 pounds of hot dry burnt lime, 1,400 pounds of crushed 75% ferrosilicon, and 125 pounds of manganese ore. The addition of manganese ore is a convenient method of obtaining the desired manganese content in the finished steel. Instead of manganese ore, it is of course possible to employ ordinary low carbon ferromanganese. When the addition of lime and ferrosilicon has fused and become thoroughly incorporated in the slag, and when the reducible oxide content of the slag has been lowered to a relatively small percentage, for example 2% or lower of iron and chromium oxide, this slag is drawn off substantially clean. A conventional basic finishing slag is then made up and added onto the bath. Such final additions of lump low carbon ferrosilicon and low carbon ferromanganese are added as may be needed to adjust the analysis of the bath to the required specifications. The heat is then tapped. In the case of the illustrative example, a product is obtained weighing 17,300 pounds and analyzing about .08% carbon, 17% chromium, .35% silicon, and .40% manganese, with sulphur and phosphorus in normally low percentages.

While I prefer to use roll scale as the iron oxide containing oxidizing agent, other materials containing a relatively high percentage of iron oxide may be employed, such, for example, as a high-grade lump hematite ore or magnetic iron ore concentrates. While I prefer to use 75% ferrosilicon, ferrosilicon having other percentages of silicon may be used, or even silicon metal may be used. While I much prefer to use a ferrosilicon reducing agent, other exothermic reducing agents may be employed, such as aluminum, magnesium, or ferro-alloys of silicon-aluminum or calcium-silicon, or the like. The ratio of iron oxide to chrome ore is governed, as pointed out above, by the percentages of carbon and chromium required in the finished product, and by the iron oxide content of the chrome ore available in the initial charge. The amount of chrome ore which may be added is limited by the capacity of the furnace to melt the charge without undue difficulty on account of poor contact. With a properly distributed charge, and a fairly high voltage, say 160 volts, several thousand pounds of chrome ore may be handled in the initial meltdown charge. Some of this ore may be added during the melting down period if desired.

The chrome ore need not be added entirely with the meltdown charge, but a certain supplemental quantity of chrome ore may be added during or subsequent to the meltdown, and this practice may be resorted to when desired. Certain practical economies in production are achieved, however, by adding a further portion of chrome ore during the relatively long melt-down period, preferably charging the ore around the banks of the furnace, and adding a final portion after the melt-down is complete and during the reduction period. By distributing the total quantity of chrome ore in this manner, rustless irons and steels, especially the higher chromium irons and steels, are efficiently and economically produced using a maximum of ore and still maintaining good furnace operating conditions. However, I prefer to incorporate most of the chrome ore in the initial charge, thereby giving it an opportunity to become thoroughly fused and incorporated in the slag prior to the addition of the silicon reducing agent, as explained above. While I prefer to use chrome ore as the source of chromium to supplement that combined in the rustless iron scrap charge, part of the chromium, preferably a small percentage, may be added as low carbon ferro-chromium, preferably before tapping, if required to accurately adjust the chromium analysis of the refined bath.

While I have described one example of my process the invention is not limited to the details of such process or to the production of any particular analysis of rustless iron, nor to any particular type of electric steel furnace. For example, in the production of the nickel-chromium grades of rustless iron, which contain, as a rule, from 8 to 12% nickel, I may employ rustless iron scrap of similar analysis together with a certain proportion of electrolytic nickel in the initial charge.

It is to be understood that the invention is not limited to its preferred embodiment above set forth, but may be otherwise embodied and practiced within the scope of the following claims.

I claim:

1. The process of making rustless iron in an electric arc furnace having carbon electrodes, which comprises melting down a charge consisting principally of rustless iron scrap, chrome ore and a material high in iron oxide, whereby a bath of molten iron having a supernatant slag containing iron and chromium oxides is produced, and adding a silicon containing reducing agent to the slag to reduce metallic iron and chromium from their oxides.

2. The process of making rustless iron in an electric arc furnace having carbon electrodes, which comprises melting down a charge consisting principally of rustless iron scrap, chrome ore and a material high in iron oxide, whereby a bath of molten iron having a supernatant slag containing iron and chromium oxides is produced, and adding lime and a silicon containing reducing agent to the slag to reduce metallic iron and chromium from their oxides in the slag into the metal.

3. The process of making rustless iron in an electric arc furnace having carbon electrodes, which comprises melting down a charge consisting principally of rustless iron scrap, chrome ore and a material high in iron oxide and superheating the molten charge to a temperature higher than that employed in ordinary steel melting electric furnace practice, whereby the carbon content of the charge is reduced or maintained low, and a bath of molten iron having a supernatant slag having the chrome ore disseminated and fused therein is produced, and adding lime and a silicon reducing agent to the slag to reduce metallic iron and chromium from their oxides in the slag into the metal.

4. The process of making rustless iron in an electric arc furnace having carbon electrodes, which comprises melting down a charge containing as essential constituents rustless iron scrap, chrome ore and a material high in iron oxide, whereby a bath of molten iron having a supernatant slag having the chrome ore disseminated and fused therein is produced, and adding to the slag an exothermic reducing agent to reduce metallic iron and chromium from their oxides in the slag into the metal.

5. The process of making rustless iron in an electric arc furnace having carbon electrodes, which comprises melting down a charge containing as essential constituents rustless iron scrap, chrome ore and a material high in iron oxide, whereby a bath of molten iron having a supernatant slag is produced containing a sufficient proportion of iron oxide to maintain a low carbon content in the metal and a sufficient amount of chromium oxide to enrich the metal with chromium to substantially the desired extent, and adding to the slag lime and a silicon reducing agent to reduce metallic iron and chromium from their oxides in the slag into the metal.

6. The process of making rustless iron in an electric arc furnace having carbon electrodes which comprises melting down a charge consisting principally of rustless iron scrap, chrome ore and a material high in iron oxide, whereby a bath of molten iron having a supernatant slag containing iron and chromium oxides is produced, adding a silicon containing reducing agent to the slag to reduce metallic iron and chromium from their oxides, drawing off the resultant residual slag, and forming on the metal bath a basic fluid deoxidizing finishing slag.

7. The process of making rustless iron in an electric arc furnace having carbon electrodes, which comprises melting down a charge containing as essential constituents rustless iron scrap, chrome ore and a material high in iron oxide, whereby a bath of molten iron having a supernatant slag is produced containing a sufficient proportion of iron oxide to maintain a low carbon content in the metal and a sufficient amount of chromium oxide to enrich the metal with chromium to substantially the desired extent, adding to the slag lime and a silicon reducing agent to reduce metallic iron and chromium from their oxides in the slag into the metal, drawing off the resultant residual slag, and adding lime, ferrosilicon, and fluorspar, to the bath to form a conventional basic finishing slag.

8. In the production of rustless iron in an electric arc furnace having carbon electrodes, the art which comprises, melting rustless iron scrap, chrome ore and a material high in iron oxide whereby a bath of molten iron having a supernatant slag containing iron and chromium oxides is formed, adding chrome ore to said bath and slag, and adding a reducing agent to the slag to reduce the oxides of iron and chromium contained therein.

9. In the production of rustless iron or steel in an electric arc furnace having carbon electrodes, the art which comprises, melting together rustless iron scrap, chrome ore and an oxide of iron to form a bath of ferrous metal and a supernatant slag containing oxides of iron and chromium, the oxides of iron removing and/or excluding carbon from said bath and the oxides of chromium inhibiting chromium oxidation from said bath, and when the bath has reached a desired low carbon content reducing the iron and chromium oxides in the slag thereby effecting an enrichment of said bath.

10. In the production of rustless iron or steel in an electric arc furnace having carbon electrodes, the art which comprises, melting together rustless iron scrap, chrome ore and an oxide of iron to form a bath of ferrous metal and a supernatant slag containing oxides of iron and chromium, the oxides of iron removing and/or excluding carbon from said bath and the oxides of chromium inhibiting chromium oxidation from said bath, maintaining said bath and slag at a temperature of superheat until the carbon content of said bath has fallen to a desired low value, and then reducing the iron and chromium oxides in the slag thereby effecting an enrichment of said bath.

11. In the production of rustless iron or steel in an electric arc furnace having carbon electrodes, the art which comprises, melting together rustless iron scrap, chrome ore and an oxide of iron to form a bath of ferrous metal and a supernatant slag containing oxides of iron and chromium, the oxides of iron removing and/or excluding carbon from said bath and the oxides of chromium inhibiting chromium oxidation from said bath, and when the bath has reached a desired low carbon content reducing the iron and chromium oxides in the slag in the presence of a further quantity of chrome ore thereby effecting a thorough reduction of said oxides and a consequent enrichment of said bath.

12. In the production of rustless iron or steel in an electric arc furnace having carbon electrodes, the art which comprises melting down a charge consisting principally of rustless iron scrap, chrome ore and a material high in iron oxide, whereby a bath of molten iron having a supernatant slag containing iron and chromium oxides is produced, adding a further quantity of chrome ore to said charge during the melt-down thereof, and adding to said bath and slag an additional quantity of chrome ore after melt-down is complete and adding a silicon reducing agent thereby effecting a substantially complete reduction of the oxides of iron and chromium contained in said slag and a consequent enrichment of said bath.

13. In the production of rustless iron or steel in an electric arc furnace having carbon electrodes and a chromite bottom, the art which comprises melting down on said bottom a charge consisting principally of rustless iron scrap, chrome ore and a material high in iron oxide, whereby a bath of molten iron having a supernatant slag containing iron and chromium oxides is produced, adding a further quantity of chrome ore to said charge during the melt-down thereof, maintaining said bath and slag at a temperature of superheat thereby excluding and/or removing carbon from said bath, and adding to said bath and slag an additional quantity of chrome ore after melt-down is complete and adding a silicon reducing agent thereby effecting a substantially complete reduction of the oxides of iron and chromium contained in said slag and a consequent enrichment of said bath.

WILLIAM B. ARNESS.